US012600885B2

(12) United States Patent
Rotto

(10) Patent No.: US 12,600,885 B2
(45) Date of Patent: Apr. 14, 2026

(54) COMPOSITION INCLUDING MONOMER WITH A CARBOXYLIC ACID GROUP, MONOMER WITH A HYDROXYL GROUP, AN ALKYL MONOMER, AND CROSSLINKER AND RELATED ARTICLE AND METHOD

(71) Applicant: 3M INNOVATIVE PROPERTIES COMPANY, St. Paul, MN (US)

(72) Inventor: Nelson T. Rotto, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 125 days.

(21) Appl. No.: 18/291,552

(22) PCT Filed: Jul. 27, 2022

(86) PCT No.: PCT/IB2022/056953
§ 371 (c)(1),
(2) Date: Jan. 23, 2024

(87) PCT Pub. No.: WO2023/007401
PCT Pub. Date: Feb. 2, 2023

(65) Prior Publication Data

US 2024/0343951 A1 Oct. 17, 2024

Related U.S. Application Data

(60) Provisional application No. 63/226,046, filed on Jul. 27, 2021.

(51) Int. Cl.

| | |
|---|---|
| ***C09J 133/02*** | (2006.01) |
| ***B32B 7/12*** | (2006.01) |
| ***B32B 15/04*** | (2006.01) |
| ***B32B 15/08*** | (2006.01) |
| ***B32B 27/08*** | (2006.01) |
| ***B32B 37/12*** | (2006.01) |
| ***C08F 220/06*** | (2006.01) |
| ***C08F 220/14*** | (2006.01) |
| ***C09J 4/06*** | (2006.01) |
| ***C09J 5/00*** | (2006.01) |
| ***C09J 11/08*** | (2006.01) |
| ***C09J 133/06*** | (2006.01) |

(52) U.S. Cl.
CPC ............... *C09J 133/02* (2013.01); *B32B 7/12* (2013.01); *B32B 15/043* (2013.01); *B32B 15/08* (2013.01); *B32B 27/08* (2013.01); *B32B 37/12* (2013.01); *C08F 220/06* (2013.01); *C08F 220/14* (2013.01); *C09J 4/06* (2013.01); *C09J 5/00* (2013.01); *C09J 11/08* (2013.01); *C09J 133/066* (2013.01); *B32B 2037/1253* (2013.01); *B32B 2307/54* (2013.01); *B32B 2307/558* (2013.01); *B32B 2307/748* (2013.01); *C08F 2800/20* (2013.01); *C09J 2433/00* (2013.01)

(58) Field of Classification Search
CPC .......... C09J 4/06; C09J 133/02; C08F 220/02; C08F 220/20
See application file for complete search history.

(56) References Cited

U.S. PATENT DOCUMENTS

| | | | |
|---|---|---|---|
| 3,347,954 | A | 10/1967 | Bredereck et al. |
| 3,436,359 | A | 4/1969 | Hubin et al. |
| 4,018,851 | A | 4/1977 | Baccei |
| 4,443,587 | A | 4/1984 | Schmitt et al. |
| 4,447,493 | A | 5/1984 | Driscoll et al. |
| 4,605,712 | A | 8/1986 | Mueller et al. |
| 4,833,213 | A | 5/1989 | Leir et al. |

(Continued)

FOREIGN PATENT DOCUMENTS

| | | |
|---|---|---|
| CN | 103342966 B | 3/2015 |
| CN | 104449418 B | 1/2017 |

(Continued)

OTHER PUBLICATIONS

International Search report for PCT International Application No. PCT/IB2022/056953, mailed on Oct. 19, 2022, 4 pages.
Sarac, "Redox Polymerization", Progress in Polymer Science, 1999, vol. 24, pp. 1149-1204.
Bayramoglu, "Preparation of collagen modified photopolymers: a new type of biodegradable gel for cell growth", Journal of Materials Science: Materials in Medicine, Nov. 2010, vol. 21, pp. 761-775.
Inan, "Preparation of Novel UV-Curable Methacrylated Urethane Resins from a Modified Epoxy Resin and Iisocyanatoethylmethacrylate (IEM)", 2002, Polymer Bulletin, vol. 47, pp. 437-444.
Yilmaz, "Effects of Nonreactive Resins on the Properties of a UV-Curable Methacrylated Urethane Resin", 1998, Journal of Applied Polymer Science, vol. 69, pp. 1837-1845.
3M Dynamar HC-1101 Polyether Diamine Safety Data Sheet, May 8, 2018, 8 pages.

*Primary Examiner* — Vu A Nguyen
(74) *Attorney, Agent, or Firm* — Kathleen B. Gross

(57) ABSTRACT

The composition includes an acrylic monomer having a carboxylic acid group, an acrylic monomer having a hydroxyl group, at least one of an alkyl acrylate or alkyl methacrylate, and from 15 to 22 percent by weight of a compound composed of divalent segments L and at least two X groups. The divalent segments L are represented by formula L. Each segment L is independently directly bonded to two secondary N atoms, two tertiary N atoms, or a secondary and a tertiary N atom. Each $R^1$ represents an alkylene group having from 1 to 4 carbon atoms, and at least some of the $R^1$ groups are $—CH_2—CH_2—CH_2—CH_2—$. Each X group is independently represented by the formula $CH_2═C(R)—C(O)—O—V—W—C(O)—$. Articles and methods using the composition are also described.

L

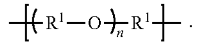

20 Claims, No Drawings

(56) References Cited

U.S. PATENT DOCUMENTS

| | | | |
|---|---|---|---|
| 5,252,629 | A | 10/1993 | Imai et al. |
| 5,334,681 | A | 8/1994 | Mueller et al. |
| 5,705,561 | A | 1/1998 | Kozakiewicz et al. |
| 6,284,360 | B1 | 9/2001 | Johnson et al. |
| 7,718,730 | B2 | 5/2010 | Roesler et al. |
| 8,313,604 | B2 | 11/2012 | Oshima et al. |
| 8,404,787 | B2 | 3/2013 | Lutz et al. |
| 8,415,425 | B2 | 4/2013 | Kanai et al. |
| 8,545,225 | B2 | 10/2013 | Takei et al. |
| 8,859,683 | B2 | 10/2014 | Takahashi et al. |
| 9,416,299 | B2 | 8/2016 | Kropp et al. |
| 9,750,842 | B2 * | 9/2017 | Kourtis .............. C08G 18/6705 |
| 9,890,304 | B2 | 2/2018 | Yurt |
| 9,957,408 | B2 | 5/2018 | Thompson |
| 10,544,272 | B2 | 1/2020 | Hatakeyama |
| 10,950,364 | B2 | 3/2021 | Hatakeyama |
| 11,390,776 | B2 | 7/2022 | Hajji et al. |
| 11,511,522 | B2 | 11/2022 | Liu et al. |
| 11,739,172 | B2 | 8/2023 | Rotto et al. |
| 2006/0264573 | A1 | 11/2006 | Bennett et al. |
| 2007/0088110 | A1 | 4/2007 | Kohl et al. |
| 2010/0160557 | A1 | 6/2010 | Murofushi |
| 2011/0120646 | A1 | 5/2011 | Gorodisher et al. |
| 2012/0139138 | A1 | 6/2012 | Samuel et al. |
| 2012/0142867 | A1 | 6/2012 | Iwasaki et al. |
| 2012/0301729 | A1 | 11/2012 | Schmider et al. |
| 2015/0291862 | A1 | 10/2015 | Krishnan et al. |
| 2016/0137893 | A1 | 5/2016 | Sherman et al. |
| 2017/0135911 | A1 | 5/2017 | Craig et al. |
| 2018/0312613 | A1 | 11/2018 | Townsend et al. |
| 2020/0017623 | A1 | 1/2020 | Ye et al. |
| 2020/0243798 | A1 | 7/2020 | Matsushita et al. |
| 2021/0040240 | A1 | 2/2021 | Moser et al. |
| 2021/0238459 | A1 | 8/2021 | Shi et al. |
| 2022/0259469 | A1 | 8/2022 | Leone et al. |
| 2022/0325022 | A1 | 10/2022 | Mahoney et al. |
| 2023/0303898 | A1 | 9/2023 | Ostlund et al. |
| 2023/0399463 | A1 | 12/2023 | Mahoney et al. |
| 2024/0059940 | A1 | 2/2024 | Rotto et al. |
| 2024/0076523 | A1 | 3/2024 | Mahoney et al. |
| 2024/0084060 | A1 | 3/2024 | Rotto et al. |

FOREIGN PATENT DOCUMENTS

| | | | | |
|---|---|---|---|---|
| CN | 108192508 | A | 6/2018 | |
| DE | 4025776 | A1 | 2/1992 | |
| EP | 0493320 | A2 | 7/1992 | |
| EP | 0670341 | B1 | 9/1999 | |
| JP | 2000053906 | A | 2/2000 | |
| JP | 3338331 | B2 | 10/2002 | |
| JP | 2016155892 | A * | 9/2016 | |
| JP | 2017179125 | A | 10/2017 | |
| JP | 2018168291 | A | 11/2018 | |
| WO | 8202048 | A1 | 6/1982 | |
| WO | WO-2020250154 | A1 * | 12/2020 | ................ C09J 4/06 |

* cited by examiner

COMPOSITION INCLUDING MONOMER WITH A CARBOXYLIC ACID GROUP, MONOMER WITH A HYDROXYL GROUP, AN ALKYL MONOMER, AND CROSSLINKER AND RELATED ARTICLE AND METHOD

CROSS-REFERENCE TO RELATED APPLICATION

This application is a national stage filing under 35 U.S.C. 371 of PCT/IB2022/056953. filed Jul. 27, 2022, which claims priority to U.S. Provisional Application No. 63/226,046, filed Jul. 27, 2021, the disclosure of which is incorporated by reference in its entirety herein.

BACKGROUND

Adhesives are known to be useful for bonding one substrate to another, e.g., a metal to a metal, a metal to a plastic, a plastic to a plastic, a glass to a glass. Structural adhesives are attractive alternatives to mechanical joining methods, such as riveting or spot welding, because structural adhesives distribute load stresses over larger areas rather than concentrating such stresses at a few points. Structural adhesives may also produce cleaner and quieter products because they can dampen vibration and reduce noise.

Additionally, structural adhesives can be used to bond a variety of materials, sometimes without extensive surface preparation.

Crosslinkers useful for certain adhesive compositions are described in U.S. Pat. No. 4,605,712 (Mueller et al.) and U.S. Pat. No. 4,447,493 (Driscoll et al.) and U.S. Pat. Appl. Pub. Nos. 2016/0137893 (Sherman et al.), 2012/0139138 (Samuel et al.), 2017/0135911 (Craig et al.), and 2020/017720 (Liu et al.).

Crosslinkers said to provide compositions having high adhesion, elongation, and impact resistance are described in Int. Pat. Appl. Pub. No. WO 2020/250154 (Mahoney). Certain acrylic adhesives reported to have high strength or a high glass transition temperature are described in Int. Pat. Appl. Pub. No. WO 2019/012088 (Hajji et al.), Japanese Patent Application JP2016155892, published Sep. 1, 2016, and China Patent Application CN104449418, published Mar. 25, 2015.

SUMMARY

The present disclosure provides a composition useful, for example, as a sealant or adhesive, for example, a structural adhesive. In one aspect the present disclosure provides a composition including an acrylic monomer having a carboxylic acid group, an acrylic monomer having a hydroxyl group, at least one of an alkyl acylate or alkyl methacrylate, and a compound composed of divalent segments L and at least two X groups. The divalent segments L are represented by the formula $$\left[\!\left( R^1-O \right)_n R^1 \right]\!. \qquad L$$

Each divalent segment L is respectively directly bonded to:

i) two secondary N atoms, each directly bonded to a further divalent segment L or an X group, ii) two tertiary N atoms, each directly bonded to p further divalent segments L and (2-p) X groups, wherein p is 0, 1, or 2, or iii) a secondary N atom directly bonded to a further divalent segment L or an X group; and a tertiary N atom directly bonded to p further divalent segments L and (2-p) X groups, wherein p is 0, 1, or 2.

In divalent segment L, each $R^1$ independently represents an alkylene group having from 1 to 4 carbon atoms, with the proviso that at least some of the $R^1$ groups are $-CH_2-CH_2-CH_2-CH_2-$. Each n independently represents a positive integer, and each X group is independently represented by the formula $$CH_2{=}C(R)-C(O)-O-V-W-C(O)-,$$

in which each R is independently hydrogen or methyl, each W is independently O, S, or $NR^2$, wherein $R^2$ is hydrogen or alkyl having up to 4 carbon atoms, and each V is independently alkylene that is optionally interrupted by at least one ether linkage or amine linkage and optionally substituted by hydroxyl. The compound composed of divalent segments L and at least two X groups is present in an amount from 15 percent to 22 percent by weight, based on the total weight of acrylic-functional compounds in the composition.

In some embodiments, the acrylic monomer having the hydroxyl group is present in an amount of at least 5 percent by weight and up to 25 percent by weight, based on the total weight of the acrylic-functional compounds in the composition. In some embodiments, the composition includes methyl methacrylate in an amount of at least 10 percent by weight and up to 50 percent by weight, based on the total weight of the acrylic-functional compounds in the composition. In some embodiments, the acrylic monomer having a carboxylic acid group is present in an amount of at least 15 percent by weight and up to 24 percent by weight, based on the total weight of acrylic-functional compounds in the composition. In some embodiments, the acrylic monomer having a carboxylic acid group is present in an amount of at least one percent by weight and less than 20 percent by weight, based on the total weight of acrylic-functional compounds in the composition.

In another aspect, the present disclosure provides an adhesive including the composition disclosed herein at least partially cured with a free-radical initiator.

In another aspect, the present disclosure provides an article bonded with the composition disclosed herein at least partially cured with a free-radical initiator.

In another aspect, the present disclosure provides a method of making a bonded article. The method includes combining the composition disclosed herein with a free-radical initiator to provide an adhesive composition, applying the adhesive composition on at least one of the first substrate or the second substrate, adhering the first substrate and the second substrate using the adhesive composition, allowing the adhesive composition to at least partially cure to make the bonded article.

As used herein:

"alkyl group" and the prefix "alk-" have only C—C bonds and C—H bonds and are inclusive of both straight chain and branched chain groups and of cyclic groups. In some embodiments, alkyl groups have up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms and other alkyl substituents;

the term "acrylic" refers to both acrylic and methacrylic polymers, oligomers, and monomers;

the term "directly bonded to" means bonded to through a single covalent bond;

the term "free-radically polymerizable" means free-radically homopolymerizable and/or free-radically copolymerizable (i.e., with a different monomer/oligomer);

the term "(meth)acryl" refers to acryl (also referred to in the art as acryloyl and acrylyl) and/or methacryl (also referred to in the art as methacryloyl and methacrylyl);

the term "secondary nitrogen" refers to a neutral N atom covalently bonded to H and two carbon atoms; and the term "tertiary nitrogen" refers to a neutral N atom covalently bonded to three carbon atoms.

Terms such as "a", "an" and "the" are not intended to refer to only a singular entity but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility but may be swellable in the presence of an appropriate solvent.

All numerical ranges are inclusive of their endpoints and non-integral values between the endpoints unless otherwise stated (e.g., 1 to 5 includes 1, 1.5, 2, 2.75, 3, 3.80, 4, 5, etc.).

Features and advantages of the present disclosure will be further understood upon consideration of the detailed description as well as the appended claims.

DETAILED DESCRIPTION

High glass transition temperatures may be desirable in adhesives, for example, to allow the adhesive to maintain consistent performance at high temperature. A common strategy for increasing the final glass transition temperature (Tg) of a cured epoxy or polyurethane structural adhesive, for example, is to apply external heat during the curing process. For example, when "3M SCOTCH-WELD Epoxy Adhesive DP420" (2-part epoxy adhesive) is cured at room temperature for several days, the Tg of the cured adhesive only reaches about 44° C. as measured by Dynamic Mechanical Analysis using the method described in the Examples, below. If this adhesive is heat cured at approximately 138° C. for a few hours, the Tg is increased to 80° C. However, low-temperature curing has become more and more desirable, particularly in the field of electronics assembly and plastic bonding applications, where bonding of thermally sensitive substrates occurs. Low-temperature curing can also reduce thermal stresses due to CTE (coefficient of thermal expansion) mismatch.

Although known structural adhesives may have good high-temperature performance and durability, the rigid bond these structural adhesives create after curing can lead to poor impact resistance of the bonded parts and subsequent bond failure. Additionally, adhesives having rigid bonds have high and uneven stresses distributed throughout the bond, with the stress at the edges of the bond typically higher than the stress in the middle of the bond. The high stress of rigid structural adhesives can lead to the undesirable distortion of bonded materials (i.e., bond-line read through), which can be visually observed particularly when bonding larger parts, such as, for example, automotive panels.

The present disclosure provides compositions that can provide adhesives with glass transition temperatures in a range from 90° C. to 160° C., 115° C. to 160° C., 125° C. to 150° C., 90° C. to 130° C., or 90° C. to 120° C. when cured at room temperature and bonded constructions displaying good adhesion to a wide variety of substrates, even, in some embodiments, when the substrates receive no surface treatment (e.g., corona, flame, abrasion) before bonding. Typically, the compositions provide adhesives with useful elongations, which may improve impact resistance and reduce stress in a bond line. In some embodiments, the compositions of the present disclosure provide adhesives with excellent resistance to water and humidity.

The composition of the present disclosure includes a compound useful, for example, as a crosslinker. The compound includes at least two X groups and includes divalent segments L represented by formula:

L

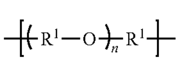

Each divalent segment L is respectively directly bonded, through the single covalent bonds illustrated on each end of the divalent segments, to:

i) two secondary N atoms, each directly bonded to a further divalent segment L or an X group, ii) two tertiary N atoms, each directly bonded to p further divalent segments L and (2-p) X groups, wherein p is 0, 1, or 2, or iii) a secondary N atom directly bonded to a further divalent segment L or an X group; and a tertiary N atom directly bonded to p further divalent segments L and (2-p) X groups, wherein p is 0, 1, or 2.

Each $R^1$ in divalent segments L independently represents an alkylene group having from 1 to 4 carbon atoms, with the proviso that at least some of the $R^1$ groups are $—CH_2—CH_2—CH_2—CH_2—$. In some embodiments, at least 50, 60, 70, 80, 90, or 95 percent of the $R^1$ groups are $—CH_2—CH_2—CH_2—CH_2—$. Other useful $R^1$ groups include $—CH_2—$, $—CH_2—CH_2—$, $—CH_2—CH_2—CH_2—$, $—CH(CH_3)CH_2—$, $—CH_2CH(CH_3)—$, $—CH(CH_2CH_3)CH_2—$, $—CH_2(CH_2CH_3)CH—$, and $—CH_2(CH_3)_2C—$. In some embodiments, the $R^1$ groups comprise $—CH_2—CH_2—CH_2—CH_2—$ and at least one of $—CH_2—CH_2—$, $—CH_2—CH_2—CH_2—$, $—CH(CH_3)CH_2—$, or $—CH_2CH(CH_3)—$. In some embodiments, all of the $R^1$ groups are $—CH_2—CH_2—CH_2—CH_2—$. When all of the $R^1$ groups are $—CH_2—CH_2—CH_2—CH_2—$, the L divalent segments can be written as

L

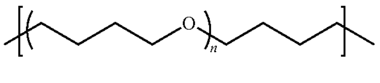.

In divalent segments L, including any of the embodiments described above for L, each n independently represents a positive integer; for example, 1, 2, 3, 4, 5, 6, 7, 8, 9, 10, 20, 30, 50, 100, or more. In some embodiments, n can be up to 500 or more.

The compound useful, for example, as a crosslinker, includes at least two X groups. Each X group is independently represented by the formula $$CH_2{=}C(R){-}C(O){-}O{-}V{-}W{-}C(O){-},$$

in which each R is independently hydrogen or methyl. In some embodiments, each R is hydrogen. In some embodiments, each R is methyl.

In formula $CH_2{=}C(R){-}C(O){-}O{-}V{-}W{-}C(O){-}$, each V is independently alkylene that is optionally interrupted by at least one ether linkage or amine linkage and optionally substituted by hydroxyl. In some embodiments, each V is independently alkylene that is optionally interrupted by at least one ether linkage. In some embodiments, each V is independently alkylene having 2 to 10, 2 to 8, 2 to 6, 2 to 4, 3 to 6, 3 to 8, or 3 to 10 carbon atoms.

In formula $CH_2{=}C(R){-}C(O){-}O{-}V{-}W{-}C(O){-}$, each W is independently O, S, or $NR^2$, wherein $R^2$ is hydrogen or alkyl having up to 4 carbon atoms. In some embodiments, each W is independently O or NH. In some embodiments, each W is NH.

In some embodiments, the compound having at least two X groups and divalent segments L has a number average molecular weight of at least 1000, 2000, 3000, 3500, or 4000 grams per mole and up to 54000, 40,000, 30,000, or 20,000 grams per mole as measured by gel permeation chromatography at 40° C. versus polystyrene standards in accordance with ASTM test method D3016-97 (2018). In particular, polymers can be analyzed by gel permeation chromatography (GPC) using Reliant GPC (Waters e2695 pump/autosampler) with Waters 2424 evaporative light scattering detector and PL-Gel-2 Columns; 300×7.5 mm each; one 3-micron Mixed-E (nominal MW range up to 30,000 Daltons) and one 5-micron Mixed-D (nominal MW range 200-400,000 Daltons).

Compounds having at least two X groups and divalent units L can be made by nucleophilic addition of primary amine groups on a polyamine precursor compound with a reactant compound having carbonate, thiocarbonate, carbamate, or isocyanate group and also an acrylate or methacrylate group. An example of a useful compound of this type is 2-isocyanatoethyl methacrylate ("IEM"). Suitable polyamine precursors have divalent segments L represented by formula:

$$-\!\left[\!\left(R^1{-}O\right)_n R^1\right]\!- \qquad L$$

as described above in any of its embodiments. Each divalent segment L is respectively directly bonded to two N atoms, each independently directly bonded to p further divalent segments L and (2-p) H atoms, wherein p is 0, 1, or 2. In some embodiments, the polyamine precursor comprises less than 7 weight percent (wt. %), less than 6 wt. %, less than 5 wt. %, less than 4 wt. %, less than 3 wt. %, less than 2 wt. %, less than 1 wt. %, or less than 0.5 wt. % of secondary or tertiary amine groups. Suitable polyamine precursors can be obtained from 3M Company, St. Paul, Minnesota, under the trade designation "DYNAMAR HC-1101" or prepared, for example, as described in U.S. Pat. No. 3,436,359 (Hubin et al.).

Compositions of the present disclosure include 15 to 22 percent by weight of the compound having at least two X groups and divalent segments L, based on the total weight of acrylic-functional compounds in the composition. In some embodiments, the crosslinker is present in an amount in a range from 15.5 or 16 to 22 percent by weight, or 15 to 21.5, 21, 20.5, 20, less than 20, or 19.5 percent by weight, based on the total weight of acrylic-functional compounds in the composition. In any of these embodiments, the amount of crosslinker can be at least 15, 15.5 or 16 percent by weight and up to 22, 21.5, 21, 20.5, 20, less than 20, or 19.5 percent by weight, based on the total weight of acrylic-functional compounds in the composition.

The composition of the present disclosure includes an acrylic monomer comprising a carboxylic acid group. In some embodiments, the acrylic monomer comprising a carboxylic acid group is present in an amount of at least one percent by weight, 5 percent by weight, 10 percent by weight, or 15 percent by weight, based on the total weight of acrylic-functional compounds in the composition. In some embodiments, the acrylic monomer comprising a carboxylic acid group is present in an amount of up to 28 percent by weight, 30 percent by weight, or 35 percent by weight, based on the total weight of acrylic-functional compounds in the composition. In these ranges, increasing the amount of the acrylic monomer comprising a carboxylic acid group can increase the Tg of the adhesive made from the composition. For example, when the acrylic monomer having the carboxylic acid group is present in an amount of at least 15 percent by weight, based on the total weight of the acrylic-functional compounds in the composition, the Tg of the adhesive can be, in some embodiments, in a range from 115° C. to 160° C. or from 125° C. to 150° C. In some embodiments, the acrylic monomer having a carboxylic acid group is present in an amount of at least 15 percent by weight and up to 30, 28, 26, or 24 percent by weight, based on the total weight of acrylic-functional compounds in the composition. In some embodiments, the acrylic monomer having a carboxylic acid group is present in an amount of at least one percent by weight and less than 20 percent by weight, based on the total weight of acrylic-functional compounds in the composition. In some embodiments, the acrylic monomer comprising a carboxylic acid group is present in an amount less than 20 percent by weight, in some embodiments up to 19, 18, 17, 16, or 15 percent by weight, based on the total weight of acrylic-functional compounds in the composition. In some embodiments, the acrylic monomer comprising a carboxylic acid group is present in an amount in a range from 1 to 19 percent by weight, 5 to 19 percent by weight, 5 to 15 percent by weight, or 6 to less than 15 percent by weight, based on the total weight of acrylic-functional compounds in the composition. When the acrylic monomer having the carboxylic acid group is present in an amount of less than 15 percent by weight, based on the total weight of the acrylic-functional compounds in the composition, the Tg of the adhesive can be, in some embodiments, in a range from 90° C. to 130° C. or from 90° C. to 120° C. Examples of suitable acrylic monomer comprising a carboxylic acid group include methacrylic acid, acrylic acid, methacrylic acid, β-acryloyl oxyethyl hydrogen succinate and #-methacryloyl oxyethyl hydrogen succinate. Many acrylic monomers comprising a carboxylic acid group are available from commercial sources, for example, methacrylic acid available from Evonik Performance Materials GmbH as VISIOMER GMAA and β-methacryloyl oxyethyl hydrogen succinate available from Shin-Nakamura Co. Ltd., Arimoto, Japan, as NK ESTER SA. In some embodiments, the acrylic monomer comprising a carboxylic acid group is methacrylic acid.

The composition of the present disclosure includes an acrylic monomer comprising a hydroxyl group. The acrylic monomer comprising the hydroxyl group can be useful, for example, for providing the composition with improved adhesion to a variety of plastics, in some embodiments, polyamides, acrylonitrile butadiene styrene (ABS), polycarbonate (PC), PC/ABS blends, polyvinyl chloride (PVC), poly(methyl) methacrylate (PMMA). In some embodiments, the acrylic monomer comprising the hydroxyl group is present in an amount of at least 5 or 10 percent by weight and up to 25, 24, 23, 22, 21, or 20 percent by weight, based on the total weight of the acrylic-functional compounds in the composition. In some embodiments, the acrylic monomer comprising the hydroxyl group is present in an amount of at least 5 percent by weight and up to 25 percent by weight, at least 10 percent by weight up to 24 percent by weight, or at least 10 percent by weight up to 22 percent by weight, based on the total weight of the acrylic-functional compounds in the composition. Selecting a level of the acrylic monomer comprising the hydroxyl group in a range from 5 percent by weight and up to 25 percent by weight can be useful, for example, for providing the composition with improved adhesion to a variety of plastics while achieving relatively high water and humidity resistance.

Examples of suitable acrylic monomers comprising a hydroxyl group include 2-hydroxyethyl acrylate, 2-hydroxyethyl methacrylate, 2- and 3-hydroxypropyl acrylate, 2- and 3-hydroxypropyl methacrylate, hydroxybutyl acrylate, hydroxybutyl methacrylate, caprolactone mono(meth)acrylate, available under the trade designation "SR-495B" from Sartomer and other poly(e-caprolactone) mono[2-(meth) acryloxy ethyl] esters, poly(e-caprolactone) mono[2-acryloxy ethyl] esters, 2-hydroxy-3-alkyloxy methacrylate, 2-hydroxy-3-alkyloxy acrylate, and polyethylene glycol mono acrylates and methacrylates. Many acrylic monomers comprising a hydroxyl group are available from commercial sources, for example, 2-hydroxyethyl methacrylate (available from Evonik Performance Materials GmbH as VISIOMER HEMA 97 and HEMA 98), hydroxypropyl methacrylate (available from Evonik Performance Materials GmbH as VISIOMER HPMA 97 and HPMA 98), ultra-high purity 2-hydroxyethyl methacrylate (available from Evonik Performance Materials GmbH as VISIOMER UHP HEMA), polypropylene glycol monomethacrylate (available from Miwon North America, Exton, Pennsylvania, as MIRAMER M1051), and $CH_2{=}CHC(O)O(CH_2CH_2O)_7\_9H$ available, for example, from Nippon Oil & Fats Company, Tokyo, Japan under the trade designation "BLEMMER".

In some embodiments, the composition of the present disclosure further comprises at least one of an alkyl acrylate or methacrylate. The alkyl group of the alkyl acrylate or methacrylate may be straight-chain, branched, or cyclic (including polycyclic) and have 1 to 14, 1 to 12, or 1 to 10 carbon atoms. Including an alkyl acrylate or methacrylate in the composition can be useful, for example, for providing relatively high water and humidity resistance and good adhesion to a variety of substrates. In some embodiments, the composition comprises methyl methacrylate. Methyl methacrylate is available from commercial sources, including from Evonik Performance Materials GmbH as VISIOMER MMA. In some embodiments, the amount of at least one of an alkyl acrylate or methacrylate or the methyl methacrylate in the composition is at least 10 percent by weight, 15 percent by weight, or 20 percent by weight, based on the total weight of the acrylic-functional compounds in the composition. In some embodiments, the amount of at least one of an alkyl acrylate or methacrylate or the methyl methacrylate in the composition is at least 25 percent by weight or at least 30 percent by weight, based on the total weight of acrylic-functional compounds in the composition. In some embodiments, the amount of at least one of an alkyl acrylate or methacrylate or the methyl methacrylate in the composition is up to 50 percent by weight, 45 percent by weight, or 40 percent by weight, based on the total weight of acrylic-functional compounds in the composition. In some embodiments, the amount of at least one of an alkyl acrylate or methacrylate or the methyl methacrylate in the composition is at least 10 percent by weight and up to 50 percent by weight, at least 10 percent by weight and up to 40 percent by weight, at least 20 percent by weight and up to 50 percent by weight, at least 25 percent by weight up to 45 percent by weight, or at least 25 percent by weight up to 40 percent by weight, based on the total weight of the acrylic-functional compounds in the composition.

Lauryl (meth)acrylate and isobornyl (meth)acrylate can be useful in some embodiments of the composition of the present disclosure. Lauryl (meth)acrylate tends to decrease the Tg of an adhesive made from a composition of the present disclosure, and isobornyl (meth)acrylate tends to increase the Tg of an adhesive made from a composition of the present disclosure. Such monomers are available from a variety of commercial sources, for example, isobornyl acrylate available from Sartomer as SR506, or from Evonik Performance Materials GmbH as VISIOMER IBOA, isobornyl methacrylate available from Sartomer as SR423A or from Evonik Performance Materials GmbH under the trade name VISIOMER IBOMA, and lauryl methacrylate available from BASF, Florham Park, New Jersey, as LMA 1214 F. In some embodiments, the composition comprises up to 20 percent by weight or up to 15 percent by weight of lauryl (meth)acrylate and/or isobornyl (meth)acrylate, based on the total weight of the acrylic-functional compounds in the composition. In some embodiments, the composition comprises at least five percent by weight of at least one of lauryl (meth)acrylate or isobornyl (meth)acrylate, based on the total weight of the acrylic-functional compounds in the composition. In some embodiments, the composition is free of at least one of lauryl (meth)acrylate or isobornyl (meth) acrylate or comprises up to five percent by weight of at least one of lauryl (meth)acrylate or isobornyl (meth)acrylate, based on the total weight of the acrylic-functional compounds in the composition.

In some embodiments, the composition of the present disclosure further comprises an acrylic monomer comprising a phosphate or phosphonate group. Such monomers can be useful, for example, for enhancing the adhesion to metal substrates. Useful acrylic monomer comprising a phosphate or phosphonate group include ethylene glycol methacrylate phosphate and phosphonate-functional (meth)acrylate monomers (e.g., the SIPOMER PAM resins from Solvay Specialty Polymers USA, LLC or those from Miwon North America (Exton, Pennsylvania) as MIRAMER SC1400 and MIRAMER SC1400A). Vinyl phosphonic acid may also be useful. In some embodiments, the composition of the present disclosure further comprises an acrylic monomer comprising a phosphonate group. The phosphonate- or phosphate-functionalized acrylic monomer can be present in the composition, for example, up to 10, 8, 6, 5, or 4 percent by weight, based on the total weight of acrylic-functional compounds in the composition. When present, the phosphonate- or phosphate-functionalized acrylic monomer is present in an amount of at least 0.5, 1, or 2 percent by weight, based on the total weight of acrylic-functional compounds in the composition.

Compositions of the present disclosure can also include other monofunctional free-radically polymerizable monomers. Examples of useful monomers include 2-phenoxyethyl (meth)acrylate, cyclohexyl (meth)acrylate, benzyl (meth)acrylate, alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formal (meth)acrylate, ethylene glycol methyl ether (meth)acrylate, ethoxylated nonyl phenol (meth)acrylate, isodecyl (meth)acrylate, isooctyl (meth)acrylate, octadecyl (meth)acrylate (stearyl (meth)acrylate), tetrahydrofurfuryl (meth)acrylate, tridecyl (meth)acrylate, tetrahydrofurfuryl (meth)acrylate, allyl (meth)acrylate, ethyl (meth)acrylate, n-propyl (meth)acrylate, n-butyl (meth) acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-methoxyethyl (meth)acrylate, 2-ethoxyethyl (meth)acrylate, 2- or 3-ethoxypropyl (meth)acrylate, 2-(2-ethoxyethoxy)ethyl acrylate, glycidyl (meth)acrylate, N-(2-(2-oxo-1-imidazolidinyl)ethyl)methacrylamide, and methacrylamidoethyl ethylene urea ("MAEEU") available from Solvay Specialty Polymers USA, LLC as SIPOMER WAM II), and combinations thereof.

Specific examples of other mono(meth)acrylate monomers useful in some embodiments of the composition of the present disclosure include 2-phenoxyethyl methacrylate (available from SARTOMER as SR340), cyclohexyl methacrylate (available from Evonik Performance Materials GmbH as VISIOMER c-HMA), benzyl methacrylate (available from Miwon North America, Exton, Pennsylvania, as MIRAMER M1183), phenyl methacrylate (available from Miwon North America as MIRAMER M1041), allyl methacrylate (available from Evonik Performance Materials GmbH as VISIOMER AMA), n-butyl methacrylate (available from Evonik Performance Materials GmbH as VISIOMER n-BMA), isobutyl methacrylate (available from Evonik Performance Materials GmbH as VISIOMER i-BMA), glycerol formal methacrylate (available from Evonik Performance Materials GmbH as VISIOMER GLYFOMA), 2-(2-butoxyethoxy)ethyl methacrylate (available from Evonik Performance Materials GmbH as VISIOMER BDGMA), 2-isocyanatoethyl methacrylate (available from Showa Denko K. K. (Tokyo, Japan) as KarenzMOI), 2-(methacryloyloxy)ethyl phthalate mono ((HEMA phthalate) available as product number X-821-2000 from ESSTECH, Inc., Essington, Pennsylvania), 2-(methacroyloxy)ethyl maleate (HEMA maleate available as product number X-846-0000 from ESSTECH, Inc.), methoxy diethylene glycol methacrylate (available from Shin-Nakamura Co. Ltd. as M-20G, methoxy triethylene glycol methacrylate (available from Shin-Nakamura Co. Ltd. as M-30G, methoxy tetraethylene glycol methacrylate (available from Shin-Nakamura Co. Ltd. as M-40G, methoxy tripropylene glycol methacrylate (available from Shin-Nakamura Co. Ltd. as M-30PG, butoxy diethylene glycol methacrylate (available from Shin-Nakamura Co. Ltd. as B-20G), phenoxy ethylene glycol methacrylate (available from Shin-Nakamura Co. Ltd. as PHE-1G), phenoxy diethylene glycol methacrylate (available from Shin-Nakamura Co. Ltd. as PHE-2G), dicyclopentenyloxyethyl methacrylate (available from Hitachi Chemical, Tokyo, Japan, as FANCRYL FA-512M), dicyclopentanyl methacrylate (available from Hitachi Chemical as FANCRYL FA-513M), isobornyl cyclohexyl methacrylate (available from Designer Molecules, Inc., San Diego, California, as product MM-304), 4-methacryloxyethyl trimellitic anhydride (available from Designer Molecules, Inc. as product A-304), 2-methacryloxyethyl phenyl urethane (available from Polysciences, Inc., Warrington, Pennsylvania), trifluoroethyl methacrylate (available from Hampford Research Inc., Stratford, Connecticut), methacrylamide (available from Evonik Performance Materials GmbH as VISIOMER MAAmide), 2-dimethylaminoethyl methacrylate (available from Evonik Performance Materials GmbH as VISIOMER MADAME), 3-dimethylaminopropyl methacrylamide (available from Evonik Performance Materials GmbH as VISIOMER DMAPMA), and combinations thereof.

Compositions of the present disclosure can also include at least one free-radical initiator (i.e., an initiator of free-radical polymerization). The free-radical initiator can be a single compound or a combination of compounds, which is referred to as a free-radical initiator system.

In some embodiments, the free-radical initiator is a redox initiator system, as one-electron transfer redox reactions may be an effective method of generating free radicals under mild conditions. Redox initiator systems have been described, for example, in *Progress in Polymer Science* (1999), 24, pp. 1149-1204.

In some embodiments, the redox initiator system is a blend of a peroxide with an amine, where the polymerization is initiated by the decomposition of the organic peroxide activated by the redox reaction with amine reducing agent. Typically, the peroxide is benzoyl peroxide, and the amine is a tertiary amine. Aromatic tertiary amines, for example, are suitable for generating the primary radicals, with N,N-dimethyl-4-toluidine ("DMT") being the most common amine reducing agent.

In some embodiments, the redox cure initiator system comprises a barbituric acid derivative and a metal salt. In some embodiments, the barbituric acid/metal salt cure initiator system may further comprise an organic peroxide, an ammonium chloride salt (e.g., benzyltributylammonium chloride), or a mixture thereof.

Examples of free-radical initiators based on barbituric acid include redox initiator systems having (i) a barbituric acid derivative and/or a malonyl sulfamide, and (ii) an organic peroxide, selected from the group consisting of the mono- or multifunctional carboxylic acid peroxide esters. Examples of useful barbituric acid derivatives include 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propylbarbituric acid, 5-ethylbarbituric acid, 5-propylbarbituric acid, 5-butylbarbituric acid, 1-benzyl-5-phenylbarbituric acid, 1-cyclohexyl-5-ethylbarbituric acid, and the thiobarbituric acids mentioned in published German patent application DE 42 19 700 A1 (Imai et al.).

The barbituric acids and barbituric acid derivatives described in U.S. Pat. No. 3,347,954 (Bredereck et al.) and U.S. Pat. No. 9,957,408 (Thompson), as well as the malonyl sulfamides disclosed in the European Pat. No. EP 0 059 451 B1 (Schmitt et al.), may also be useful in embodiments of the present disclosure. Examples of malonyl sulfamides include 2,6-dimethyl-4-isobutylmalonyl sulfamide, 2,6-diisobutyl-4-propylmalonyl sulfamide, 2,6-dibutyl-4-propylmalonyl sulfamide, 2,6-dimethyl-4-ethylmalonyl sulfamide or 2,6-dioctyl-4-isobutylmalonyl sulfamide.

Barbituric acid-based free-radical initiators typically contain mono- or multifunctional carboxylic acid peroxyesters as organic peroxides. Carbonic peroxyesters are also included among the multifunctional carboxylic acid peroxyesters within the meaning of the present disclosure. Suitable examples include carbonic-diisopropyl-peroxydiester, neodecanoic acid-tertiary-butyl-peroxyester, neodecanoic acid-tertiary-amyl-peroxyester, maleic acid-tertiary-butyl-monoperoxyester, benzoic acid-tertiary-butyl-peroxyester, 2-ethylhexanoic acid-tertiary-butyl-peroxyester, 2-ethylhexanoic acid-tertiary-amyl-peroxyester, carbonic-monoisopropylester-monotertiary-butyl-peroxyester, carbonic-dicyclohexyl-peroxyester, carbonic dimyristyl-peroxyester, carbonic dicetyl peroxyester, carbonic-di(2-ethylhexyl)-peroxyester, carbonic-tertiary-butyl-peroxy-(2-ethylhexyl)ester or 3,5,5-trimethyl-hexanoic acid-tertiary-butyl-peroxyester, benzoic acid-tertiary-amyl-peroxyester, acetic acid-tertiary-butyl-peroxyester, carbonic-di(4-tertiary-butyl-cyclohexyl)-peroxyester, neodecanoic acid-cumene-peroxyester, pivalic acid-tertiary-amyl-peroxyester and pivalic acid tertiary-butyl-peroxyester.

In particular, carbonic-tertiary-butyl-peroxy-(2-ethylhexyl)ester (commercially available from Arkema, Inc. (King of Prussia, Pennsylvania) as LUPEROX TBEC) or 3,5,5-trimethyl-hexanoic acid-tertiary-butyl-peroxyester (commercially available from Arkema, Inc. as LUPEROX 270) can be used as organic peroxides in some embodiments of the present disclosure.

Metal salts that may be used with the barbituric acid derivative can include transition metal complexes, especially salts of cobalt, manganese, copper, and iron. When the metal salt is a copper compound, the salt may possess the general formula $CuX_n$, where X is an organic and/or inorganic anion and n=1 or 2. Examples of suitable copper salts include copper chloride, copper acetate, copper acetylacetonate, copper naphthenate, copper salicylate or complexes of copper with thiourea or ethylenediaminetetraacetic acid, and mixtures thereof. In some embodiments, the copper salt is copper naphthenate.

Another redox initiator system suitable for use in embodiments of the present disclosure comprises an inorganic peroxide, an amine-based reducing agent, and an accelerator, where the amine may be an aromatic and/or aliphatic amine, and the polymerization accelerator is at least one selected from the group consisting of sodium benzenesulfinate, sodium p-toluenesulfinate, sodium 2,4,6-trisopropyl benzenesulfinate, sodium sulfite, potassium sulfite, calcium sulfite, ammonium sulfite, sodium bisulfate, and potassium bisulfate. An example of an inorganic peroxide useful in this system is peroxodisulfate as described in U.S. Pat. No. 8,545,225 (Takei, et al.).

In some embodiments, the composition of the present disclosure includes a free-radical initiator comprising a metal salt (e.g., copper naphthenate) and an ammonium salt (e.g., benzyltributylammonium chloride). In some embodiments, composition includes a cure initiator system comprising a barbituric acid derivative and a metal salt and optionally comprising at least one of an organic peroxide and an ammonium chloride salt.

The composition may include, alone or in combination with other free-radical initiator(s), at least one photoinitiator that is activated by light, generally using an ultraviolet (UV) lamp, although other light sources such as LED lamps, Xe flashlamps, and lasers can also be used with the appropriate choice of photoinitiator.

Useful photoinitiators include those known as useful for photocuring free-radically polyfunctional (meth)acrylates. Examples of suitable photoinitiators include benzoin and its derivatives such as alpha-methylbenzoin; alpha-phenylbenzoin; alpha-allylbenzoin; alpha benzylbenzoin; benzoin ethers such as benzil dimethyl ketal (e.g., available as OMNIRAD BDK from IGM Resins USA Inc., St. Charles, Illinois), benzoin methyl ether, benzoin ethyl ether, benzoin n-butyl ether; acetophenone and its derivatives such as 2-hydroxy-2-methyl-1-phenyl-1-propanone (e.g., available as OMNIRAD 1173 from IGM Resins USA Inc. and 1-hydroxycyclohexyl phenyl ketone (e.g., available as OMNIRAD 184 from IGM Resins USA Inc.); 2-methyl-1-[4-(methylthio)phenyl]-2-(4-morpholinyl)-1-propanone (e.g., available as OMNIRAD 907 from IGM Resins USA Inc.); 2-benzyl-2-(dimethylamino)-1-[4-(4-morpholinyl)phenyl]-1-butanone (e.g., available as OMNIRAD 369 from IGM Resins USA Inc.), and triaryl phosphines and phosphine oxide derivatives such as ethyl-2,4,6-trimethylbenzoylphenyl phosphinate (e.g., available as TPO-L from IGM Resins USA Inc.), and bis-(2,4,6-trimethylbenzoyl)phenylphosphine oxide (e.g., available under the trade designation OMNIRAD 819 from IGM Resins USA Inc.).

Other examples of useful photoinitiators include pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis(eta5-2,4-cyclopentadien-1-yl)-bis[2,6-difluoro-3-(1H-pyrrol-1-yl) phenyl] titanium (e.g., available under the trade designation CGI 784DC from BASF, Florham Park, New Jersey); halomethylnitrobenzenes (e.g., 4-bromomethylnitrobenzene), and combinations of photoinitiators where one component is a mono- or bis-acylphosphine oxide (e.g., available under the trade designations IRGACURE 1700, IRGACURE 1800, and IRGACURE 1850 from BASF, Florham Park, New Jersey, and as OMNIRAD 4265 from IGM Resins USA Inc.).

The free-radical initiator can also be a thermally activated free-radical initiator such as an azo initiator (e.g., azobisisobutyronitrile) or a peroxide (e.g., benzoyl peroxide).

The free-radical initiator can be used in the composition in an amount sufficient to permit an adequate free-radical reaction rate of curing of the curable composition upon initiation of polymerization, amounts which may be readily determined by one of ordinary skill in the relevant arts. In some embodiments of the present disclosure, the free-radical initiator is present in the curable composition at a level of 0.1 to 10 percent by weight, or 0.5 to 5 percent by weight of the free-radically polymerizable components in the composition; however, this is not a requirement.

In some embodiments, the composition of the present disclosure comprises 5 to 19 percent by weight of the acrylic monomer comprising a carboxylic acid group, 5 to 25 percent by weight of the acrylic monomer comprising a hydroxyl group, 20 to 50 percent by weight of methyl methacrylate, 0.5 to 10 percent by weight of an acrylic monomer comprising a phosphonate group, and 15 to 22 percent by weight of the compound comprising divalent segments L and at least two X groups, based on the total weight of acrylic-functional compounds in the composition. In some embodiments, the composition of the present disclosure comprises 15 to 24 percent by weight of the acrylic monomer comprising a carboxylic acid group, 5 to 25 percent by weight of the acrylic monomer comprising a hydroxyl group, 15 to 40 percent by weight of methyl methacrylate, 0.5 to 10 percent by weight of an acrylic monomer comprising a phosphonate group, and 15 to 22 percent by weight of the compound comprising divalent segments L and at least two X groups, based on the total weight of the acrylic-functional compounds in the composition. In some of these embodiments, the composition includes 0.1 to 10 percent by weight of at least one free-radical initiator based on the total weight of the curable composition.

The composition of the present disclosure may include other components useful, for example, in sealant and adhesive compositions. For example, the composition can include at least one of toughening agents such as natural or synthetic rubbers which may be elastomeric resins or elastomeric fillers (e.g., acrylic core/shell polymers; styrene-butadiene/methacrylate core/shell polymers; acrylonitrile-butadiene rubber; natural rubber, polyisoprene rubber, polyurethane), plasticizers (e.g., aliphatic and aromatic hydrocarbons, alkyl esters, alkyl ethers, aryl esters, and aryl ethers), tackifiers, corrosion inhibitors, UV stabilizers, antioxidants, free-radical inhibitors, flame retardants, thixotropic agents such as fumed silica, dyes, pigments (e.g., ferric oxide, brick dust, carbon black, and titanium oxide), reinforcing agents (e.g., silica, magnesium sulfate, calcium sulfate, and beryllium aluminum silicate), clays such as bentonite, other suitable filler (e.g., glass beads, talc, and calcium metasilicate), dispersing agents, wetting agents, adhesion promoters (e.g., silane coupling agents), antistatic agents, thermally and/or electrically conductive particles, foaming agents, and hollow polymeric or ceramic microspheres (e.g., glass bubbles). In some embodiments, the composition of the present disclosure includes a filler. Further examples of fillers useful for some embodiments of the composition of the present disclosure include at least one of a micro-fibrillated polyethylene, a fumed silica, a talc, a wollastonite, an aluminosilicate clay (e.g., halloysite), phlogopite mica, calcium carbonate, kaolin clay, metal oxides (e.g., barium oxide, calcium oxide, magnesium oxide, zirconium oxide, titanium oxide, zinc oxide), nanoparticle fillers (e.g., nanosilica, nanozirconia).

In some embodiments, the composition of the present disclosure comprises a rubber toughening agent (e.g., an elastomeric resin or elastomeric filler such as acrylic core/shell polymers; styrene-butadiene/methacrylate core/shell polymers; acrylonitrile-butadiene rubber, natural rubber, polyisoprene, polyurethane) in an amount of at least ten percent by weight, based on the total weight of the composition.

In some embodiments, the composition of the present disclosure comprises acrylonitrile-butadiene rubber in an amount of at least ten percent by weight, based on the total weight of the composition. In some embodiments, the composition of the present disclosure comprises a rubber toughening agent (e.g., acrylic core/shell polymers; styrene-butadiene/methacrylate core/shell polymers; acrylonitrile-butadiene rubber) in an amount of up to 25 or 20 percent by weight, based on the total weight of the composition. In some embodiments, the composition of the present disclosure comprises acrylonitrile-butadiene rubber in an amount of up to 25 or 20 percent by weight, based on the total weight of the composition. In some embodiments, the composition of the present disclosure comprises inorganic filler (e.g., fumed silica, a talc, a wollastonite, an aluminosilicate clay (e.g., halloysite), phlogopite mica, calcium carbonate, kaolin clay, metal oxides (e.g., barium oxide, calcium oxide, magnesium oxide, zirconium oxide, titanium oxide, zinc oxide), nanoparticle fillers (e.g., nanosilica, nanozirconia)) in an amount up to ten percent by weight, based on the total weight of the composition. In some embodiments, the composition of the present disclosure comprises phlogopite mica in an amount less than 10, 9, 8, 7, or 6 percent by weight, based on the total weight of the composition.

The composition of the present disclosure may be provided as a one-part or two-part composition; for example, depending on the free-radical initiator chosen. When a free-radical initiator system including a combination of components is used, some of the components can be included in a first part and some components can be included in the second part of a two-part composition. In some embodiments, if the composition of the present disclosure is the first part of a two-part composition, the first part may include at least one of a metal salt or an ammonium chloride salt as described above in any of their embodiments, and the second part may include at least one of a barbituric acid derivative and an organic peroxide. The second part may be in the form of a paste, for example, that includes a plasticizer or other diluent and optionally at least one of tougheners, dyes, pigments, tackifiers, or fillers as described above. Some peroxide pastes, for example, are commercially available. An example of a useful second part is an acrylic adhesive accelerator obtained under the trade designation "3M SCOTCH-WELD DP8810", from 3M Company, St. Paul, Minn.

In some embodiments, if the composition of the present disclosure is the first part of a two-part composition, the first part and the second part can be combined at any suitable volume ratio. For example, the first part and the second part can be combined at a volume ratio in a range of from about 5:100 to about 100:1, about 10:100 to about 50:1, or about 1:1 to 20:1.

The first part and the second part can be located in any suitable system or kit for containing, mixing, and dispensing the first part and the second part. The system can be suited for large-scale industrial applications or small-scale applications. Either system can include first and second chambers for holding the respective first part and second part. The chambers can be sized for any application and formed from plastic, metal, or any other suitable material. A dispenser can be adapted to receive the first part and the second part and dispense a mixture of the first part and the second part on a substrate. The dispenser can function to facilitate mixing of the first part and the second part, or a mixing chamber can be disposed upstream of the dispenser and in fluid communication with the first chamber and the second chamber. The mixing chamber can be adapted to rotate in order to facilitate mixing, or the mixing chamber can include a number of baffles to induce rotation of the first part and the second part.

To facilitate movement of the first part and the second part, the system can include elements such as one or more plungers or one or more pumps. The one or more plungers can be useful for systems that are handheld. In these embodiments, a user can push one or two plungers, between at least a first and a second position, to force the first part and the second part through the system. If there is one plunger, then the first part and the second part can be dispensed at equal volumes or at a predetermined volume ratio.

Pumps can be useful in industrial applications where large volumes or a continuous supply of the first part and the second part are dispensed. These systems can include one or more pumps that are in fluid communication with the first and second chambers. The one or more pumps can be located downstream of the first and second chambers but upstream of the mixing chamber. In embodiments of the system in which there are two pumps in fluid communication with respective first and second chambers, the pumps can be adapted or controlled to pump an equal volume of the first part and the second part or to pump different quantities of each part according to a predetermined volume ratio.

The composition of the present disclosure may be at least partially cured by exposure to actinic electromagnetic radiation (e.g., ultraviolet and/or visible light), thermal energy (e.g., in an oven, infrared radiation, or thermal conduction), by exposure to oxygen, by combining two parts of a two-part composition, or any combination of the foregoing.

After at least partial curing, a crosslinked composition is generally obtained, and if it is sufficiently cured, it may be suitable for use as a structural adhesive to bond two adherends. In such use, the composition is typically sandwiched between the adherends and at least partially cured; for example, sufficient to achieve at least a desired level of bond strength.

Compositions of the present disclosure may be used, for example, to bond a first substrate to a second substrate to provide a bonded article. Many types of substrates may be bonded with compositions of the present disclosure such as metal (e.g., stainless steel or aluminum), glass (e.g., which may be coated with indium tin oxide), a polymer (e.g., a plastic, rubber, thermoplastic elastomer, or thermoset), or a composite. A composite material may be made from any two or more constituent materials with different physical or chemical properties. When the constituents are combined to make a composite, a material having characteristics different from the individual components is typically achieved. Some examples of useful composites include fiber-reinforced polymers (e.g., carbon fiber reinforced epoxies and glass-reinforced plastic); metal matrix compositions, and ceramic matrix composites. Useful polymeric substrates that can be bonded include polymers such as polyolefins (polypropylene, polyethylene, high density polyethylene, blends of polypropylene), polyamide 6 (PA6), polyamide 6,6, acrylonitrile butadiene styrene (ABS), polycarbonate (PC), PC/ABS blends, polyvinyl chloride (PVC), polyamide (PA), polyurethane (PUR), thermoplastic elastomers (TPE), polyoxymethylene (POM), polystyrene, poly(methyl methacrylate) (PMMA), polyvinyl chloride (PVC), polyetheretherketone (PEEK), and combinations thereof. The substrate may also include a metal coating on such polymers. The composition of the present disclosure can be useful, for example, for bonding electronic articles and automotive and aerospace components.

In some embodiments, a first substrate may be bonded to a second substrate by combining the composition with an accelerator to provide an adhesive composition, applying the composition of the present disclosure to at least a portion of one surface of the first substrate, adhering the first substrate and the second substrate using the adhesive composition, and allowing the adhesive composition to cure to make the bonded article. While it is not practical to enumerate a particular curing temperature suitable for all situations, generally suitable temperatures are in a range from about 23° C. to about 200° C. In some embodiments, advantageously, the composition can be cured at room temperature (e.g., 20° C. to 30° C., or 22° C. to 25° C.), for at least 60 minutes, 90 minutes, 120 minutes, 6 hours, 12 hours, 24 hours, 48 hours, or 72 hours for example, to cure the composition.

As shown in the Examples, below, the composition of the present disclosure can be cured at room temperature to provide an adhesive having a glass transition temperature of 98° C. to 145° C. The composition of the present disclosure can be useful for providing adhesives with relatively lower Tg (e.g., 90° C. to 130° C.) and higher elongations (30% to 250%) and for providing adhesives with relatively higher Tg (e.g., 115° C. to 160° C.) and lower elongations (20% to 80%). Tg and elongation are measured using the methods described in the Examples, below.

Illustrative Examples A and B represent adhesives with relatively higher amounts (23 and 30.6 percent by weight, respectively, based on the total weight of the acrylic-functional compounds in the composition) of the compound comprising divalent segments L and at least two X groups than in the composition of the present disclosure. Illustrative Example C represents adhesives with a relatively lower amount (11.8 percent by weight, based on the total weight of the acrylic-functional compounds in the composition) of the compound comprising divalent segments L and at least two X groups than in the composition of the present disclosure. The adhesives of Illustrative Examples A to C have good adhesion to polyamide and aluminum and temperature and humidity resistance as determined by overlap shear evaluations. Examples 1 to 10 are compositions including the compound comprising divalent segments L and at least two X groups in various amounts in a range from 15 to 22 percent by weight, based on the total weight of the acrylic-functional compounds in the composition. As shown in Table 3, below, compositions having the compound comprising divalent segments L and at least two X groups in this range generally have at least one of improved adhesion to polyamide, higher peel strength, or higher side impact strength relative to Illustrative Examples A to C. In making this comparison, compositions providing adhesives with relatively lower Tg (e.g., 98° C. to 112° C.) and higher elongations (66% to 193%) can be compared with Illustrative Example A, and compositions providing adhesives with relatively higher Tg (e.g., 133° C. to 145° C.) and lower elongations (22% to 35%) can be compared with Illustrative Example B. The adhesive bonds can withstand heating under high humidity as shown in Table 3, below. Side impact strength and adhesion to aluminum can be further improved when the amount of inorganic filler is not more than ten percent by weight, based on the total weight of the composition, as shown in a comparison of Examples 2 and 7 with Examples 1, 5, 6, and 8 to 10 in Table 3.

Some Embodiments of the Disclosure

In a first embodiment, the present disclosure provides a composition comprising:

an acrylic monomer comprising a carboxylic acid group;
at least one of an alkyl acrylate or alkyl methacrylate;
an acrylic monomer comprising a hydroxyl group; and
a compound comprising divalent segments L and at least two X groups in an amount from 15 percent to 22 percent by weight, based on the total weight of acrylic-functional compounds in the composition, wherein the divalent segments L are represented by the formula:

$$-\left[\left(R^1-O\right)_n R^1\right]- \qquad L$$

wherein each divalent segment L is independently directly bonded to:

i) two secondary N atoms, each directly bonded to a further divalent segment L or an X group, ii) two tertiary N atoms, each directly bonded to p further divalent segments L and (2-p) X groups, wherein p is 0, 1, or 2, or iii) a secondary N atom directly bonded to a further divalent segment L or an X group; and a tertiary N atom directly bonded to p further divalent segments L and (2-p) X groups, wherein p is 0, 1, or 2, wherein each $R^1$ independently represents an alkylene group having from 1 to 4 carbon atoms, with the proviso that at least some of the $R^1$ groups are —$CH_2$—$CH_2$—$CH_2$—$CH_2$—, wherein each n independently represents a positive integer, and wherein each X group is independently represented by the formula $$CH_2{=}C(R)—C(O)—O—V—W—C(O)—$$

wherein each R is independently hydrogen or methyl, each W is independently O, S, or $NR^2$, wherein $R^2$ is hydrogen or alkyl having up to 4 carbon atoms, and wherein each V is independently alkylene that is optionally interrupted by at least one ether linkage or amine linkage and optionally substituted by hydroxyl.

In a second embodiment, the present disclosure provides the composition of the first embodiment, wherein at least fifty percent of the $R^1$ groups are —$CH_2$—$CH_2$—$CH_2$—$CH_2$—.

In a third embodiment, the present disclosure provides the composition of the first or second embodiment, wherein the divalent L segments are represented by formula

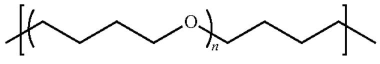, wherein each n represents a positive integer.

In a fourth embodiment, the present disclosure provides the composition of any one of the first to third embodiments, wherein the acrylic monomer comprising the hydroxyl group is present in an amount of at least 5 or 10 percent by weight and up to 25, 24, 23, 22, 21, or 20 percent by weight, based on the total weight of the acrylic-functional compounds in the composition.

In a fifth embodiment, the present disclosure provides the composition of any one of the first to fourth embodiments, wherein the at least one of an alkyl acrylate or alkyl methacrylate comprises methyl methacrylate.

In a sixth embodiment, the present disclosure provides the composition of any one of the first to fifth embodiments, comprising methyl methacrylate in an amount of at least 15 percent by weight and up to 50 percent by weight, based on the total weight of the acrylic-functional compounds in the composition.

In a seventh embodiment, the present disclosure provides the composition of any one of the first to sixth embodiments, wherein the at least one of an alkyl acrylate or alkyl methacrylate comprises at least one of lauryl methacrylate, lauryl acrylate, isobornyl methacrylate, or isobornyl acrylate.

In an eighth embodiment, the present disclosure provides the composition of any one of the first to seventh embodiments, comprising at least one of lauryl methacrylate or isobornyl methacrylate in an amount of up to 20 percent by weight, based on the total weight of the acrylic-functional compounds in the composition.

In a ninth embodiment, the present disclosure provides the composition of any one of the first to eighth embodiments, further comprising 0.5 to 10 percent by weight of an acrylic monomer comprising a phosphonate group, based on the total weight of the acrylic-functional compounds in the composition.

In a tenth embodiment, the present disclosure provides the composition of any one of the first to ninth embodiments, wherein the compound comprising divalent segments L and at least two X groups is present in an amount of at least 15.5 percent by weight, based on the total weight of the acrylic-functional compounds in the composition.

In an eleventh embodiment, the present disclosure provides the composition of any one of the first to tenth embodiments, further comprising a rubber toughening agent in an amount of at least ten percent by weight, based on the total weight of the composition.

In a twelfth embodiment, the present disclosure provides the composition of the eleventh embodiment, wherein the rubber toughening agent is acrylonitrile-butadiene rubber.

In a thirteenth embodiment, the present disclosure provides the composition of any one of the first to twelfth embodiments, further comprising inorganic filler in an amount up to ten percent by weight, based on the total weight of the composition.

In a fourteenth embodiment, the present disclosure provides the composition of any one of the first to twelfth embodiments, further comprising phlogopite mica filler in an amount up to ten percent by weight, based on the total weight of the composition.

In a fifteenth embodiment, the present disclosure provides the composition of any one of the first to fourteenth embodiments, further comprising a free-radical inhibitor.

In a sixteenth embodiment, the present disclosure provides the composition of any one of the first to fifteenth embodiments, wherein the acrylic monomer comprising the carboxylic acid group is present in an amount of at least 5 percent by weight and less than 20 or up to 19, 18, 17, 16, or 15 percent by weight, based on the total weight of the acrylic-functional compounds in the composition.

In a seventeenth embodiment, the present disclosure provides the composition of any one of the first to fifteenth embodiments, wherein the acrylic monomer comprising the carboxylic acid group is present in an amount of at least 15 percent by weight and up to 30, 28, 26, 25, or 24 percent by weight, based on the total weight of the acrylic-functional compounds in the composition.

In an eighteenth embodiment, the present disclosure provides the composition of any one of the first to seventeenth embodiments, further comprising a free-radical initiator.

In a nineteenth embodiment, the present disclosure provides the composition of any one of the first to eighteenth embodiments, packaged as a first part of a two-part adhesive composition, wherein a second part comprises a free-radical initiator.

In a twentieth embodiment, the present disclosure provides an adhesive comprising the composition of any one of the first to sixteenth embodiments at least partially cured with a free-radical initiator, wherein the adhesive has a glass transition temperature in a range from 90° C. to 130° C.

In a twenty-first embodiment, the present disclosure provides an adhesive comprising the composition of any one of the first to fifteenth or seventeenth embodiments at least partially cured with a free-radical initiator, wherein the adhesive has a glass transition temperature in a range from 115° C. to 160° C.

In a twenty-second embodiment, the present disclosure provides an adhesive comprising the composition of any one of the first to sixteenth or twentieth embodiments at least partially cured with a free-radical initiator, wherein the adhesive has an elongation in a range from 30 percent to 250 percent.

In a twenty-third embodiment, the present disclosure provides an adhesive comprising the composition of any one of the first to fifteenth, seventeenth, or twenty-first embodiments at least partially cured with a free-radical initiator, wherein the adhesive has an elongation in a range from 20 percent to 80 percent.

In a twenty-fourth embodiment, the present disclosure provides an article bonded with the composition of any one of the first to twenty-third embodiments at least partially cured with a free-radical initiator, wherein the article comprises at least one of plastic, metal, or glass, in some embodiments, at least one of plastic or metal.

In a twenty-fifth embodiment, the present disclosure provides the article of the twenty-fourth embodiment, wherein the article comprises at least one of polyamide, aluminum, acrylonitrile butadiene styrene, poly(methyl methacrylate), or polyvinyl chloride, in some embodiments, at least one of polyamide or aluminum.

In a twenty-sixth embodiment, the present disclosure provides a method of making a bonded article comprising a first substrate and a second substrate, the method comprising:

combining the composition of any one of the first to seventeenth embodiments with a free-radical initiator to provide an adhesive composition;

applying the adhesive composition on at least one of the first substrate or the second substrate;

adhering the first substrate and the second substrate using the adhesive composition; and allowing the adhesive composition to at least partially cure to make the bonded article.

In a twenty-seventh embodiment, the present disclosure provides the method of the twenty-sixth embodiment, wherein at least one of the first substrate or the second substrate comprises at least one of plastic, metal, or glass, in some embodiments, at least one of plastic or metal.

In a twenty-eighth embodiment, the present disclosure provides the method of the twenty-seventh embodiment, wherein at least one of the first substrate or the second substrate comprises at least one of polyamide, aluminum, acrylonitrile butadiene styrene, poly(methyl methacrylate), or polyvinyl chloride, in some embodiments, at least one of polyamide or aluminum.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. The following abbreviations are used in this section: in =inches, g=grams, kg=kilogram, lb=pound, min=minutes, ° C.=degrees Celsius, ° F.=degrees Fahrenheit, RH=relative humidity, Hz=hertz, J=Joules, °=degree angle, cm=centimeters, mm=millimeters, um=micrometers, and rpm=revolutions per minute.

TABLE 1

Materials Used in the Examples

| Name | Description |
|---|---|
| IEM | 2-isocyanatoethyl methacrylate, obtained under the trade designation “KARENZ MOI”, from Showa Denko K. K., Tokyo, Japan |
| HEMA | 2-hydroxyethyl methacrylate (HEMA), obtained under the trade designation “VISIOMER HEMA 97”, from Evonik Performance Materials GmbH, Essen, Germany |
| LMA | Lauryl Methylacrylate; obtained under the trade designation “LMA 1214F”, from BASF, Florham Park, NJ |
| MMA | Methyl methacrylate, obtained under the trade designation “VISIOMER MMA”, from Evonik Performance Materials GmbH, Essen, Germany |
| IBOMA | Isobornyl Methylacrylate, obtained under the trade designation “VISIOMER TERRA IBOMA”, from Evonik Performance Materials GmbH, Essen, Germany. |
| MAA | Methacrylic acid, obtained from Alfa Aesar, Tewksbury, MA |
| MBS | Methylmethacrylate-butadiene-styrene (MBS) core-shell toughening agent, obtained under the trade designation “CLEARSTRENGTH XT100”, from Arkema Inc., King of Prussia, PA |
| NBR | Acrylonitrile-butadiene rubber (NBR) with calcium stearate as separating agent, obtained under the trade designation “BAYMOD N 34.52”, from ARLANXEO Corporation, Pittsburgh, PA |
| MEHQ | Hydroquinone monomethyl ether (4-Methoxyphenol), obtained from Millipore Sigma, St. Louis, MO |
| N+CL− | Benzyl tributylammonium chloride, obtained from Sachem Americas, Austin, TX |
| HC-1101 | Branched poly(tetrahydrofuran) diamine with primary amine content of 7143 g/eq and total amine content of 5243 g/eq, obtained under the trade designation “DYNAMAR HC-1101”, from 3M Company, St. Paul, MN |
| CuNap | Copper naphthenate 8% in mineral spirits), obtained from Strem Chemicals, Newburyport, MA |
| PAM 200 | Phosphonate-functional methacrylate monomer, obtained under the trade designation “SIPOMER PAM-200”, from Solvay Novecare, Cranbury, NJ |
| ESS50F | Micro fibrillated polyethylene, hydrophilic grade, aspect ratio 20:1 length:diameter, obtained under the trade designation “SHORT STUFF ESS50F”, from MiniFibers, Inc., Johnson City, TN |

TABLE 1-continued

| Materials Used in the Examples | |
|---|---|
| Name | Description |
| HDK H18 | Hydrophobic amorphous silica, obtained under the trade designation "HDK H18", from Wacker Silicones, Müchen, Germany |
| PW80 | Filler, obtained under the trade designation "LKAB PW80", from LKAB Minerals, Inc., Chicago, IL |
| CB | Carbon black, obtained under the trade designation "MONARCH 120", from Cabot Corp., Billerica, MA |
| SL300 | Hollow ceramic spheres having mean particle size of 100 micrometers, obtained under the trade designation "E-SPHERES SL300", from Envirospheres Pty., Ltd., Linfield NSW, Australia |
| DP8810NS | 2-part epoxy adhesive, obtained under the trade designation "3M SCOTCH-WELD DP8810 NS", from 3M Company |

Test Methods

Tensile and Modulus Testing of Cured Films

Films of cured compositions were prepared by extruding the Examples or Illustrative Examples as two-part compositions through a static mixer onto a silicone polyester liner. Using a second silicone polyester liner, a film of the adhesive was prepared between both liners at approximately 1 mm (0.04 in) thickness using a simple knife coater. The adhesive film was allowed to cure at room temperature a minimum of 24 hours before testing. Tensile elongation and Young's Modulus measurements were performed according to ASTM Standard D638-14 "Standard Test Method for Tensile Properties of Plastics", 2015, sections 11.3.1 "Percent Elongation (based on test equipment used) Crosshead displacement—no external extensometer available" and 11.4 "Modulus of Elasticity" using an Instron Model 5565 instrument (obtained from Instron, Norwood, MA), a TYPE-V die for specimen cutting, and a 100 mm/minute crosshead test speed.

Dynamic Mechanical Analysis ("DMA")

Film samples were prepared using the films prepared for the Tensile Testing as described above. Film samples were cut to approximately 5-6 mm width×1 mm thick×57 mm length (0.20-0.24 in×0.04 in×2.25 in) and tested on a DMAQ800 (TA Instruments Inc., New Castle, DE) using a dual cantilever fixture with the following settings: frequency=1 Hz, oscillation amplitude=15 um, and minimum oscillation force=0.02 N. The film samples were equilibrated to −50° C. (122° F.) and held at that temperature for five minutes, followed by a temperature ramp of 3.0° C. (37.4° F.)/minute to 200° C. (392° F.).

Bell Peel Strength Test

The Bell Peel test was based on ASTM D-3167, using a Material Testing Systems Insight 30 EL instrument (obtained from MTS Systems Corporation, Eden Prairie, MN), with some modifications. The test sample was prepared using a 1 in×7 in×0.063 in (2.54 cm×17.8 cm×0.16 cm) chemically etched 2024 T3 Alclad aluminum strip (obtained from Erickson Metals of Minnesota, Coon Rapids, MN) and a 1 in×10 in×0.020 in (2.54 cm×25.4 cm×0.051 cm) chemically etched 2024 T3 Alclad aluminum strip (obtained from Erickson Metals of Minnesota). Mixed adhesive was applied to both strips (except for a 3-in (7.6-cm) section of the 10-in (25.4 cm) strip, 17 mil (0.043 cm) spacer beads were lightly sprinkled onto the adhesive, and the two strips were bonded together using a 15-lb (6.8-kg) roller to press the aluminum strips together. The sample was then held together with eight binder clips for a minimum of 24 hours at room temperature (about 25° C. (77° F.)) to cure the adhesive. Note that the 3-in (7.6-cm) section of the thinner aluminum extended beyond the 7-in (17.8-cm) section of the bonded aluminum strips. The sample was tested using a roller drum peel test fixture. The thinner aluminum strip was inserted through the rollers of the floating roller apparatus and clamped by the lower jaw. A 200-lb (0.9 kN) load cell was used, and the sample was tested at a rate of 6 in (15.24 cm)/min. Two or three samples were tested, and the average is reported in Table 3, below. The peel strength is reported as lb force/linear inch. The peel strength is reported as an average over 3 in. (7.6 cm) (i.e., 1.5 in (3.8 cm) to 4.5 (11.4 cm)).

Overlap Shear Test

The mixed adhesives of the Examples and Illustrative Examples were used to prepare overlap shear test samples on Nylon 6,6 and Aluminum substrates. All Nylon 6,6 samples, obtained from Plastics International, Eden Prairie, MN were 6.35×25.4×101.6 mm (¼×1×4 in). Aluminum coupon samples, obtained from Joseph t. Ryerson and Son, Inc., Coon Rapids, MN were 2.54×10.16×0.16 cm (1 in×4 in×1/16 in) and were prepared using one of two methods: (1) only wiped with isopropanol alcohol prior to bonding, or (2) abraded with a pad with the trade designation "SCOTCH BRITE" (3M Company, St. Paul, MN) and mounted on an elastic palm sander followed by wiping with isopropanol alcohol prior to bonding. A 1.27-cm (½ in) overlap was used when preparing the overlap shear samples. The bond line was clamped with binder clips during cure and the clips were removed after 24 hours at 25° C. Testing for overlap shear was run on a Material Testing Systems Insight 30 EL instrument (obtained from MTS Systems Corporation) with a 5,620 lb (25 kN) load cell for aluminum samples and a 2250 lb (10 kN) load cell for plastic samples. Plastic overlap shear samples were run at 50.8 mm (2 in)/min and aluminum overlap shear samples were run at 2.54 mm (0.1 in)/min. The peak stress values (psi) were reported, and each value was an average of three specimens.

Side Impact Test

All bonds were prepared by dispensing the Example or Illustrative Example formulations and accelerator through a static mixing tip on abraded aluminum substrates, described above in the Overlap Shear Test. Impact samples were 2.54 cm×10.16 cm×0.16 cm (1 in×4 in×0.063 in) aluminum coupons with a 1.27-cm (0.5 in) overlap. The bond line was clamped with binder clips during cure and the clips were removed after 24 hours at 25° C. (77° F.). The side to be impacted was polished using a grinder to make a sample in which the adhesive and aluminum substrates are flush. The samples were tested on an CP9050 Impact Pendulum (Instron, Norwood, MA) with the samples held in a clamp and impacted on the edge of the bonded area. The test parameters were ISO 179-1, using a 21.6 J hammer dropped from a 150.0° angle.

Humidity Soak Overlap Shear Test

Aluminum overlap shear samples for all of the mixed adhesives of the Examples or Illustrative Examples described above were subjected to 66° C. (150° F.) and 80% RH for 6 weeks. To prepare for testing, the standard aluminum coupons were wiped with isopropanol (IPA) and bonded with each individual adhesive to form a standard overlap shear (OLS) sample. These OLS samples were then placed in an environmental chamber set at 66° C. (150° F.) and 80% RH. A set of three OLS control samples were not placed in the 66° C. (150° F.)/80% RH chamber, and instead were kept in the laboratory at ambient conditions. Three OLS samples were removed from the 66° C. (150° F.)/80% RH chamber after 6 weeks, and after equilibrating to room temperature over 60-90 minutes, the OLS samples were tested using the standard Overlap Shear Test at 2.54 mm (0.1 in)/min. An average "peak stress psi" was recorded. The results of all the samples removed from the 66° C. (150° F.)/80% RH chamber were compared against the average "peak stress psi" of the three control samples, and the "% strength retention" was calculated and expressed as a percent and presented in Table 3.

Cataplasm Test

Ten overlap shear samples were prepared using abraded aluminum coupons, with aluminum obtained from Joseph t. Ryerson and Son, Inc., Coon Rapids, MN, measuring 2.54×10.16×0.16 cm (1 in×4 in×1/16 in). The coupons were abraded with a pad with the trade designation "SCOTCH BRITE" (3M Company, St. Paul, MN) and mounted on an electric palm sander followed by wiping with MEK solvent prior to bonding The OLS samples were bonded with a 1.27-cm (0.5 in) overlap and adhesives were let to cure for at least 24 hours. Five of the ten samples were used as controls and were stored in the laboratory under ambient conditions. The remaining five OLS samples were carefully wrapped in 100% cotton batting. The wrapped samples were placed in a bag, with trade designation "ZIPLOC" (S.C. Johnson and Son, Inc., Racine, WI), and distilled water was added with the amount of water added being ten times the total weight of the cotton batting used. The bag was sealed and placed in a second identical bag which was also sealed. The double bagged sample was then placed on an aluminum tray and placed in an oven set at 71° C. (160° F.) for two weeks. After 2 weeks in the 71° C. (160° F.) oven, the samples were immediately placed in a freezer at −17.8° C. (0° F.) for two hours. And then after 2 hours in the freezer, the samples were let to thaw over two hours, and then immediately the standard overlap shear test was administered at 2.54 mm (0.1 in)/min with a 5620 lb (25 kN) load cell. Both the cataplasm samples and the control samples were tested using the Overlap Shear Test at the same time, and the "% strength retention" was calculated based on the average of all the controls. Results for this testing are reported in Table 3.

Preparation of Methacryloxyurea-terminated Branched Diamine Poly(tetrahydrofuran) (EPX-IEM)

DYNAMAR HC-1101 ("HC-1101") was heated at 65° C. to melt the solid material and reduce its viscosity. Melted HC-1101 (245.0 g) was charged in a 3-necked, round bottom flask equipped with distillation head, thermocouple, and overhead stirrer. The flask was sparged with nitrogen and heated to 70° C. To the highly viscous, heated "HC-1101", methyl ethyl ketone (60 mL) was added with stirring. Afterwards, the same amount of methyl ethyl ketone was distilled off under vacuum to provide dried "HC-1101". To the dried "HC-1101", 5.32 g of IEM was added dropwise under nitrogen, and stirring was continued at 70° C. for 16 hours. Isocyanate consumption was monitored by transmission-FTIR spectroscopy. The resulting material was drained at 70° C. to afford 196.2 g (78% yield) of a viscous, light-yellow oil that solidified upon cooling to ambient temperature.

Preparation of Illustrative Examples A to C and Examples 1 to 10

Examples were prepared by combining components in the amounts indicated in Table 2 in a polypropylene MAX 600 DAC cup (FlackTek, Inc., Landrum, SC). Each of the sets of material ingredients was speed mixed for 4 minutes at 1750 rpm, except for where noted. First, the hydroxyethyl methacrylate (HEMA), methacrylic acid (MAA), benzyl tributylammonium chloride (N+CL—), and methoxyethylhydroquinone (MEHQ) were combined and speed mixed with a DAC 400.2 VAC (FlackTek, Inc., Landrum, SC) for 4 minutes at 1500 rpm. Then the solid EPX-IEM material was melted in an oven at 66° C. (150° F.), the melted material was added to the speed mixer cup, and the resulting material was speed mixed at 2250 rpm for 4 minutes. The NBR material was then added next, and the mixture was speed mixed for 4 minutes at 1900 rpm. The material was let to cool for 5 minutes and then speed mixed for 4 minutes at 1900 rpm. The speed mixing procedure was then repeated for a total of 16 minutes of mixing. The MBS was then added to the speed mixer cup, and the mixture was speed mixed for 4 minutes at 1900 rpm. Next, the CuNap, PAM 200, HDK H18, and ESS50F were added, and the mixture was speed mixed at 1900 rpm for 4 min. The PW80, CB, and SL300 were added, and the mixture was speed mixed for 4 min at 1900 rpm. The final adhesive resin mixture was then degassed by capping the mixing cup with a polypropylene lid that contained a vent hole, and high-shear mixed under reduced pressure 0.68 psi (~35 Torr) for 2 minutes. The adhesive resin mixture prepared was separately loaded into the 10-part side of a 10:1 dual syringe cartridge dispenser, using the accelerator with the trade designation "3M SCOTCH-WELD DP88IONS" Acrylic Adhesive (3M Company, St. Paul, MN) in the 1-part side of the dispenser in each case.

TABLE 2

Components for Illustrative Examples A to C and Examples 1 to 10 in Weight Percent

| Example | LMA | HEMA | MAA | MMA | IBOMA | EPX-IEM | NBR | MBS | MEHQ |
|---|---|---|---|---|---|---|---|---|---|
| Illustrative Example A | 0.00 | 13.76 | 9.66 | 27.68 | 0.00 | 24.01 | 1.83 | 7.00 | 0.05 |
| Illustrative Example B | 5.00 | 13.00 | 19.00 | 11.00 | 8.92 | 18.00 | 2.04 | 6.34 | 0.05 |

TABLE 2-continued

| Components for Illustrative Examples A to C and Examples 1 to 10 in Weight Percent | | | | | | | | | |
|---|---|---|---|---|---|---|---|---|---|
| Example 1 | 1.14 | 14.25 | 17.51 | 12.51 | 9.78 | 15.31 | 14.25 | 3.34 | 0.05 |
| Example 2 | 1.04 | 13.04 | 16.03 | 11.45 | 8.95 | 14.02 | 13.04 | 3.05 | 0.05 |
| Example 3 | 5.01 | 13.76 | 9.30 | 31.05 | 0.00 | 14.04 | 12.05 | 3.04 | 0.05 |
| Example 4 | 5.02 | 13.80 | 9.33 | 31.51 | 0.00 | 14.09 | 12.23 | 3.01 | 0.05 |
| Example 5 | 1.01 | 13.05 | 16.06 | 18.08 | 11.00 | 14.05 | 13.05 | 1.50 | 0.05 |
| Example 6 | 1.04 | 13.04 | 16.04 | 20.16 | 8.97 | 14.04 | 13.04 | 1.50 | 0.05 |
| Example 7 | 1.04 | 13.06 | 16.04 | 11.46 | 8.96 | 12.00 | 15.00 | 3.06 | 0.05 |
| Example 8 | 0.00 | 13.07 | 10.03 | 28.72 | 9.01 | 12.10 | 14.09 | 1.53 | 0.05 |
| Example 9 | 0.00 | 13.08 | 16.09 | 22.62 | 9.10 | 12.05 | 14.04 | 1.55 | 0.05 |
| Example 10 | 0.00 | 13.03 | 16.05 | 24.39 | 9.05 | 12.02 | 14.06 | 0.00 | 0.05 |
| Illustrative Example C | 0.00 | 13.23 | 16.24 | 26.35 | 9.25 | 9.17 | 14.14 | 0.00 | 0.05 |

| Example | N+CL− | CuNap | PAM 200 | ESS 50F | HDK H18 | PW80 | CB | SL300 |
|---|---|---|---|---|---|---|---|---|
| Illustrative Example A | 0.56 | 0.09 | 3.29 | 0.64 | 2.49 | 8.48 | 0.14 | 0.32 |
| Illustrative Example B | 0.57 | 0.11 | 3.36 | 0.67 | 2.51 | 8.95 | 0.15 | 0.34 |
| Example 1 | 0.59 | 0.12 | 3.34 | 0.76 | 2.50 | 4.03 | 0.18 | 0.35 |
| Example 2 | 0.59 | 0.12 | 3.47 | 0.69 | 2.50 | 11.46 | 0.17 | 0.32 |
| Example 3 | 0.25 | 0.13 | 3.30 | 0.79 | 2.54 | 4.12 | 0.18 | 0.39 |
| Example 4 | 0.26 | 0.12 | 3.35 | 0.00 | 2.57 | 4.18 | 0.15 | 0.32 |
| Example 5 | 0.57 | 0.12 | 3.34 | 0.69 | 2.53 | 4.38 | 0.17 | 0.35 |
| Example 6 | 0.57 | 0.12 | 3.34 | 0.69 | 2.53 | 4.37 | 0.17 | 0.35 |
| Example 7 | 0.59 | 0.13 | 3.47 | 0.69 | 2.50 | 11.47 | 0.17 | 0.32 |
| Example 8 | 0.57 | 0.12 | 3.32 | 0.00 | 2.55 | 4.34 | 0.15 | 0.33 |
| Example 9 | 0.58 | 0.12 | 3.33 | 0.00 | 2.62 | 4.28 | 0.15 | 0.33 |
| Example 10 | 0.57 | 0.13 | 3.34 | 0.00 | 2.51 | 4.32 | 0.15 | 0.33 |
| Illustrative Example C | 0.57 | 0.12 | 3.31 | 0.00 | 2.71 | 4.36 | 0.17 | 0.33 |

Results

For Illustrative Examples A to C and Examples 1 to 10, the test methods above were performed, and the results are presented in Table 3. In Table 3, "N/A" means that the test was not carried out.

TABLE 3

Test Results for Illustrative Examples A to C and Examples 1 to 10

| Example | Tg ° C. (tan delta) | % Elongation | Modulus (psi) | Peel Strength (lbf/in) −40 C. | Peel Strength (lbf/in) 23 C. | Peel Strength (lbf/in) 85 C. | Side Impact (J) | OLS Nylon 6,6 (psi) | Aluminum (abraded, MEK wiped) (psi) | OLS Aluminum (MEK wiped only) (psi) | Cataplasm (% Strength Retention) | 150/80 6 weeks (% Strength Retention) |
|---|---|---|---|---|---|---|---|---|---|---|---|---|
| Illustrative Example A | 112 | 62 | 38126 | 28.0 | 39.2 | 58.3 | 9.8 | 1217 | 2612 | 2542 | 40.5% | 62.5% |
| Illustrative Example B | 138 | 17.0 | 49907 | 2.4 | 18.7 | 55.2 | 5.3 | 1028 | 3274 | 3165 | 41.5% | 71.5% |
| Example 1 | 142 | 35.5 | 44236 | N/A | N/A | N/A | 17.1 | 1455 | 3638 | 3660 | 36.0% | 62.0% |
| Example 2 | 136 | 29.0 | 58305 | N/A | N/A | N/A | 4.3 | 1466 | 3044 | N/A | 39.0% | N/A |
| Example 3 | 108 | 180 | 29561 | 32.1 | 57.3 | 71.9 | 15.7 | 1129 | 2978 | 2870 | 42.5% | 62.0% |
| Example 4 | 98 | 193 | 28147 | N/A | 51.7 | N/A | 16.9 | 1108 | 3025 | N/A | 44.0% | N/A |
| Example 5 | 134 | 26.6 | 49155 | N/A | 43.4 | N/A | 12.8 | 1246 | 3697 | 3826 | 44.0% | 66.0% |
| Example 6 | 133 | 34.6 | 51095 | 13.0 | 42.0 | 53.8 | 17.2 | 1265 | 3746 | 3774 | 41.5% | 69.0% |
| Example 7 | 145 | 23.0 | 57145 | N/A | N/A | N/A | 3.7 | 1595 | 3066 | N/A | 36.0% | N/A |
| Example 8 | 112 | 65.9 | 44401 | N/A | N/A | N/A | 19.1 | 1307 | 3775 | 3883 | 41.0% | 57.0% |
| Example 9 | 137 | 29.7 | 53356 | N/A | 47.5 | N/A | 14.6 | 1097 | 4049 | 4015 | 40.5% | 63.0% |
| Example 10 | 133 | 26.7 | 44067 | N/A | N/A | N/A | 8.5 | 1038 | 3995 | 4200 | 40.0% | 65.0% |
| Illustrative Example C | 138 | 22.0 | N/A | N/A | N/A | N/A | 5.6 | 1096 | 3948 | 3844 | 39.0% | 72.0% |

The preceding description, given in order to enable one of ordinary skill in the art to practice the claimed disclosure, is not to be construed as limiting the scope of the disclosure, which is defined by the claims and all equivalents.

What is claimed is:

1. A composition comprising:

an acrylic monomer comprising a carboxylic acid group;

at least one of an alkyl acrylate or alkyl methacrylate;

an acrylic monomer comprising a hydroxyl group; and a compound comprising divalent segments L and at least two X groups in an amount from 15 percent to 22 percent by weight, based on the total weight of acrylic-functional compounds in the composition, wherein the divalent segments L are represented by the formula:

$$-\!\!\left[\left(R^1-O\right)_n R^1\right]\!\!- \qquad L$$

wherein each divalent segment L is independently directly bonded to:

i) two secondary N atoms, each directly bonded to a further divalent segment L or an X group, ii) two tertiary N atoms, each directly bonded to p further divalent segments L and (2-p) X groups, wherein p is 0, 1, or 2, or iii) a secondary N atom directly bonded to a further divalent segment L or an X group; and a tertiary N atom directly bonded to p further divalent segments L and (2-p) X groups, wherein p is 0, 1, or 2, wherein each $R^1$ independently represents an alkylene group having from 1 to 4 carbon atoms, with the proviso that at least some of the $R^1$ groups are $—CH_2—CH_2—CH_2—CH_2—$, wherein each n independently represents a positive integer, and wherein each X group is independently represented by the formula $$CH_2{=}C(R)—C(O)—O—V—W—C(O)—$$

wherein each R is independently hydrogen or methyl, each W is independently O, S, or $NR^2$, wherein $R^2$ is hydrogen or alkyl having up to 4 carbon atoms, and wherein each V is independently alkylene that is optionally interrupted by at least one ether linkage or amine linkage and optionally substituted by hydroxyl.

2. The composition of claim 1, wherein the acrylic monomer comprising the hydroxyl group is present in an amount of at least 5 percent by weight and up to 25 percent by weight, based on the total weight of the acrylic-functional compounds in the composition.

3. The composition of claim 1, wherein the at least one of an alkyl acrylate or alkyl methacrylate comprises methyl methacrylate.

4. The composition of claim 3, comprising methyl methacrylate in an amount of at least 15 percent by weight and up to 50 percent by weight, based on the total weight of the acrylic-functional compounds in the composition.

5. The composition of claim 1, wherein the at least one of an alkyl acrylate or alkyl methacrylate comprises at least one of lauryl methacrylate, lauryl acrylate, isobornyl methacrylate, or isobornyl acrylate.

6. The composition of claim 1, further comprising a rubber toughening agent in an amount of at least ten percent by weight, based on the total weight of the composition.

7. The composition of claim 1, further comprising inorganic filler in an amount up to ten percent by weight, based on the total weight of the composition.

8. The composition of claim 1, wherein the acrylic monomer comprising the carboxylic acid group is present in an amount of at least 5 percent by weight and up to 19 percent by weight, based on the total weight of the acrylic-functional compounds in the composition.

9. The composition of claim 1, wherein the acrylic monomer comprising the carboxylic acid group is present in an amount of at least 15 percent by weight and up to 30 percent by weight, based on the total weight of the acrylic-functional compounds in the composition.

10. The composition of claim 1, packaged as a first part of a two-part adhesive composition, wherein a second part comprises a free-radical initiator.

11. An adhesive comprising the composition of claim 8 at least partially cured with a free-radical initiator, wherein the adhesive has at least one of a glass transition temperature in a range from 90° C. to 130° C. or an elongation in a range from 30 percent to 250 percent.

12. An adhesive comprising the composition of claim 9 at least partially cured with a free-radical initiator, wherein the adhesive has at least one of a glass transition temperature in a range from 115° C. to 160° C. or an elongation in a range from 20 percent to 80 percent.

13. An article bonded with the composition of claim 1 at least partially cured with a free-radical initiator, wherein the article comprises at least one of polyamide, aluminum, acrylonitrile butadiene styrene, poly (methyl methacrylate), or polyvinyl chloride.

14. A method of making a bonded article comprising a first substrate and a second substrate, the method comprising:

combining the composition of claim 1 with a free-radical initiator to provide an adhesive composition;

applying the adhesive composition on at least one of the first substrate or the second substrate;

adhering the first substrate and the second substrate using the adhesive composition; and allowing the adhesive composition to at least partially cure to make the bonded article.

15. The method of claim 14, wherein at least one of the first substrate or the second substrate comprises at least one of a plastic or a metal.

16. The composition of claim 6, wherein the rubber toughening agent is acrylonitrile-butadiene rubber.

17. The composition of claim 5, comprising at least one of lauryl methacrylate or isobornyl methacrylate in an amount of up to 20 percent by weight, based on the total weight of the acrylic-functional compounds in the composition.

18. The composition of claim 1, wherein at least fifty percent of the $R^1$ groups are $—CH_2—CH_2—CH_2—CH_2—$.

19. The composition of claim 1, further comprising phlogopite mica filler in an amount up to ten percent by weight, based on the total weight of the composition.

20. The composition of claim 1, further comprising 0.5 to 10 percent by weight of an acrylic monomer comprising a phosphonate group, based on the total weight of the acrylic-functional compounds in the composition.

* * * * *